United States Patent
Lin

(10) Patent No.: US 6,834,746 B1
(45) Date of Patent: Dec. 28, 2004

(54) CASTER BRAKE SYSTEM

(76) Inventor: Ching-Sung Lin, No. 22-2, Lane 143, Tan-Hsing Street, Shu-Lin City, Taipei Hsien (TW)

( * ) Notice: Subject to any disclaimer, the term of this patent is extended or adjusted under 35 U.S.C. 154(b) by 0 days.

(21) Appl. No.: 10/699,776

(22) Filed: Nov. 4, 2003

(51) Int. Cl.[7] .............................................. B60B 33/00
(52) U.S. Cl. ...................................... 188/1.12; 16/35 R
(58) Field of Search ........................ 188/1.12; 16/35 R, 16/35 D

(56) References Cited

U.S. PATENT DOCUMENTS

| | | | | |
|---|---|---|---|---|
| 1,633,638 A | * | 6/1927 | Jarvis et al. ................. | 16/35 R |
| 1,671,774 A | * | 5/1928 | McIntosh .................... | 188/1.12 |
| 3,479,681 A | * | 11/1969 | Maslow ...................... | 188/1.12 |
| 3,890,669 A | * | 6/1975 | Reinhards .................. | 188/1.12 |
| 4,035,864 A | * | 7/1977 | Schroder .................... | 188/1.12 |
| 4,494,272 A | * | 1/1985 | Morita ........................ | 16/35 R |
| 4,706,328 A | * | 11/1987 | Broeske ...................... | 16/35 R |
| 4,870,715 A | * | 10/1989 | Schnuell .................... | 188/1.12 |
| 4,998,320 A | * | 3/1991 | Lange ........................ | 188/1.12 |
| 5,083,341 A | * | 1/1992 | Milbredt et al. ........... | 188/1.12 |
| 5,133,106 A | * | 7/1992 | Milbredt et al. ........... | 188/1.12 |
| 5,139,116 A | * | 8/1992 | Screen ....................... | 188/1.12 |
| 5,184,373 A | * | 2/1993 | Lange ........................ | 188/1.12 |
| 5,242,035 A | * | 9/1993 | Lange ........................ | 188/1.12 |
| 5,617,934 A | * | 4/1997 | Yang .......................... | 188/1.12 |
| 5,664,645 A | * | 9/1997 | Rodriguez .................. | 188/1.12 |
| 5,988,323 A | * | 11/1999 | Chu ........................... | 188/1.12 |
| 6,336,524 B1 | * | 1/2002 | Van Loon et al. ......... | 188/1.12 |
| 6,584,641 B1 | * | 7/2003 | Milbredt ..................... | 16/35 R |

* cited by examiner

*Primary Examiner*—Robert A. Siconolfi
(74) *Attorney, Agent, or Firm*—Birch, Stewart, Kolasch & Birch, LLP

(57) ABSTRACT

A caster brake system includes an operation bar connected to an upper cam that drives a lower cam downward to push a pushing member which pivoted a braking member to stop the wheel. The lower cam is connected to a disk that has teeth and is lowered with the lower cam. A frame to which a wheel is connected includes a hole having notches that are engaged with the teeth of the disk so that the lower cam is combined with the frame as one piece. Both of the upper cam and the lower cam are received in a tubular member on a connection plate that is connected to a body of a stroller or a cart.

12 Claims, 6 Drawing Sheets

US 6,834,746 B1

CASTER BRAKE SYSTEM

FIELD OF THE INVENTION

The present invention relates to a caster brake system having a connection frame and rollers both of which are stopped in a braking operation.

BACKGROUND OF THE INVENTION

A conventional stroller or shopping cart having casters generally equipped with a brake system for the wheels and generally a stop rod is inserted into the rim of the wheel to stop the shopping cart. Nevertheless, this conventional brake system can only stop the wheel but the frame which is rotatably connected to the wheel so that if the shopping cart moves along a downward slope, even if the wheels are stopped, the frames could rotate an angle and this results in falling of the goods on the cart. Another well-known brake system is to shift a brake bar to touch the outer surface of the wheel. This accelerates the worn of the wheel and the inherent problem is not improved.

The present invention intends to provide a caster brake system wherein the frame connected to the wheel is held in position when the wheel is stopped.

SUMMARY OF THE INVENTION

In accordance with one aspect of the present invention, there is provided a caster brake system that comprises a connection unit having a connection plate for connected with a cart or a stroller. A tubular member is connected to an underside of the connection plate so as to receive an upper cam that is rotatably received therein and a lower cam. The upper cam has first protrusions on an underside thereof and the lower cam has second protrusions on a top thereof. The lower cam is moved downward when a peak of each of the first protrusions contacts a peak of the second protrusion corresponding thereto. A disk is connected to an underside of the lower cam and has teeth on an outer periphery thereof.

A frame unit has a frame having an open top so as to receive the lower cam and a hole is defined through a bottom of the frame. A plurality of notches is defined in an inner periphery of the hole so as to match with the teeth of the disk when the disk is moved toward the hole. Two plates are connected to an underside of the frame and two wheel support arms extend from the two plates.

A braking unit has a pushing member pivotably located between the two plates and a first end of the pushing member can be pushed by the underside of the lower cam. A braking member is pivotably mounted to the two plates and a first end of the braking member can be pushed by a second end of the pushing member so that a second end of the braking member can stop the wheel of a wheel unit connected to the wheel support arms.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
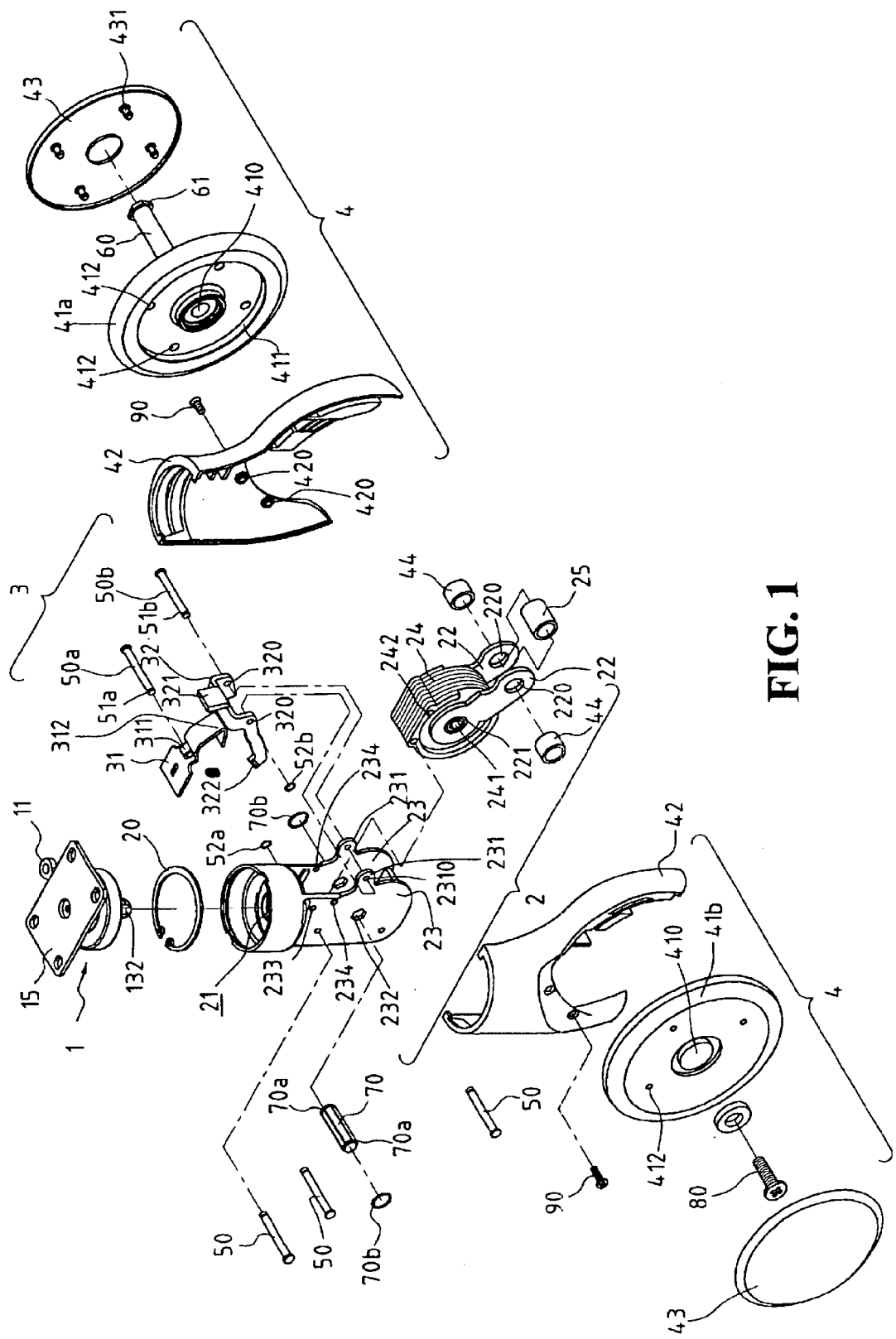
FIG. 1 is an exploded view showing a brake system of the present invention.
Figure 2:
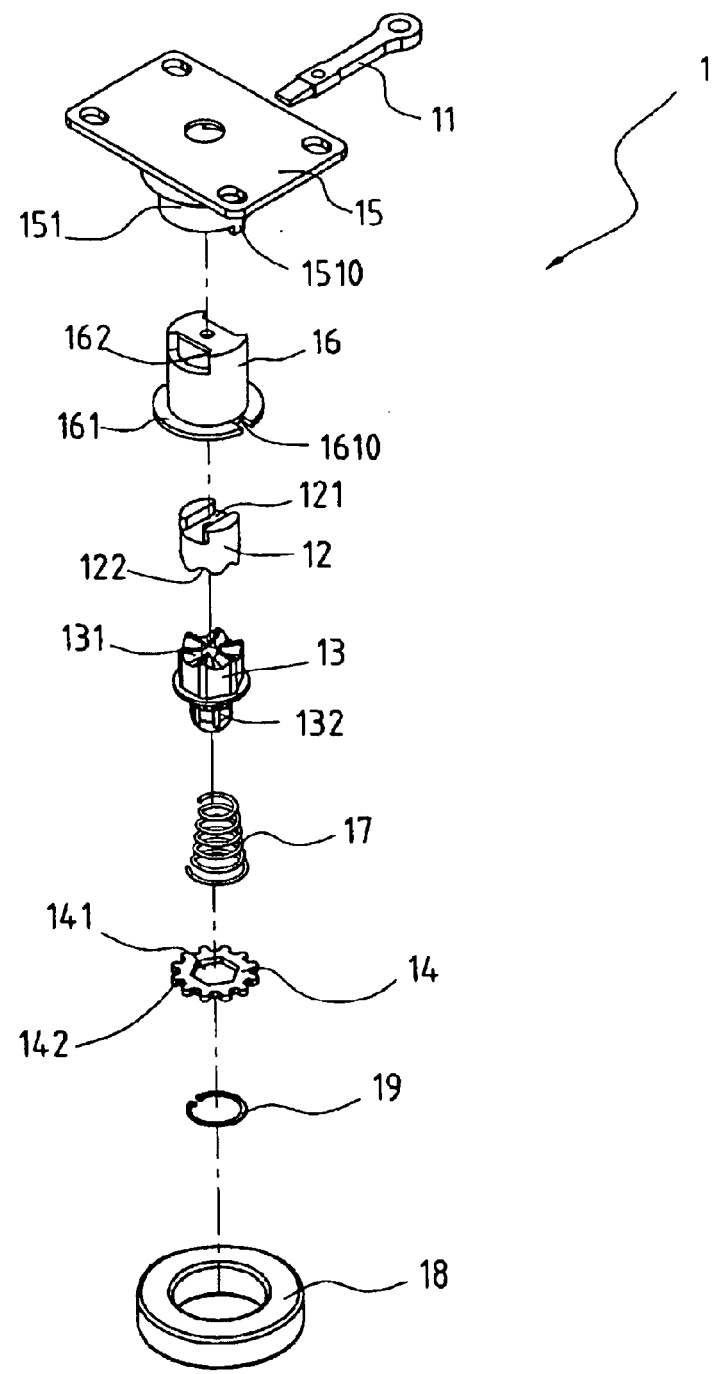
FIG. 2 is an exploded view showing a connection unit of the brake system of the present invention.
Figure 3:
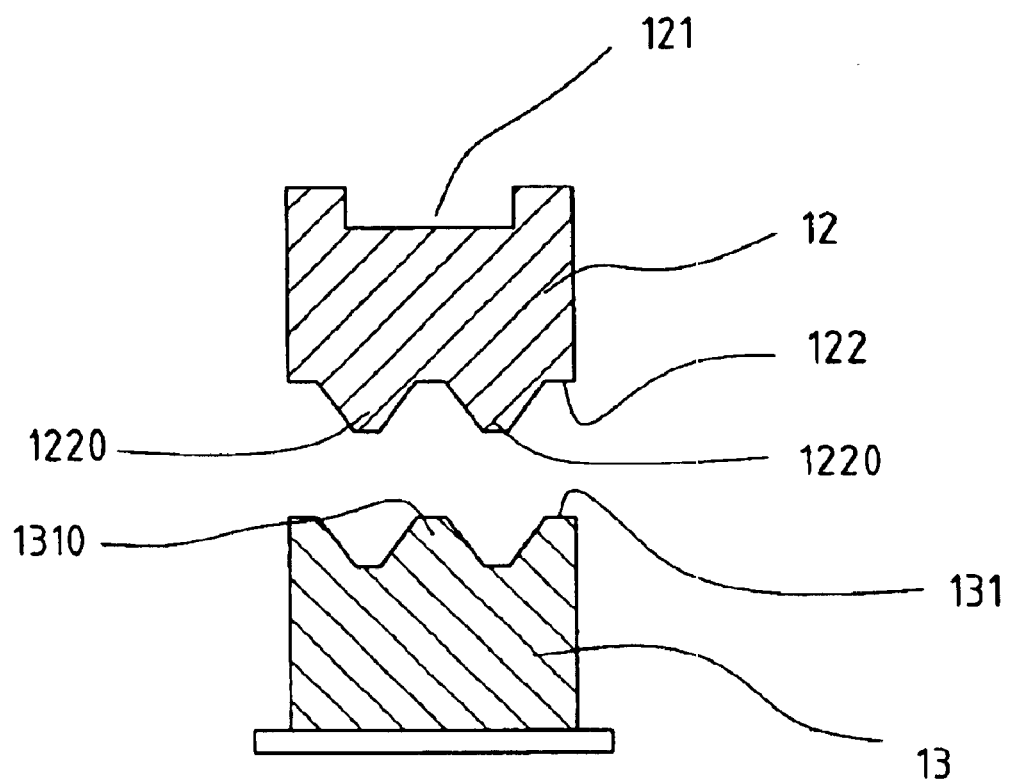
FIG. 3 shows the profile of the upper cam and the lower cam in the connection unit.

Referring to FIGS. 1, 2, 3 and 6, a caster brake system of the present invention comprises a connection unit 1 having a connection plate 15 on a top thereof so as to be connected to a body of a stroller or a cart (not shown). A tubular member 151 is connected to an underside of the connection plate 15 and includes two first slots 1511. A sleeve 16 is received in the tubular member 151 from an underside of the tubular member 151 and has two second slots 162 which are located in alignment with the first slots 1511. A boss 1510 extends from an end of the tubular member 151 and the sleeve 16 has a flange 161 which has a recess 1610. The boss 1510 is engaged with the recess 1610. An upper cam 12 is rotatably received in the tubular member 151 and has a serrated underside 122 which includes first protrusions 1220. A passage 121 is defined in a top surface of the upper cam 12 and an operation bar 11 extends through the first slots 1511, the second slots 162 and the passage 121 of the upper cam 12 such that the upper cam 12 is rotated by operating the operation bar 11. A lower cam 13 is movably received in the tubular member 151 and has a serrated top 131 which has second protrusions 1310. The lower cam 13 is moved downward when a peak of each of the first protrusions 1220 contacts a peak of the second protrusion 1310 corresponding thereto. A polygonal member 132 extends from the underside of the lower cam 13 and a disk 14 has a polygonal hole 141 through which the polygonal member 132 extends. A spring 17 is located between the underside of the lower cam 13 and the disk 14. A first C-shaped clip 19 fixes an end of the spring 17 to the lower cam 13. The disk 14 has teeth 141 on an outer periphery thereof.

Figure 4:
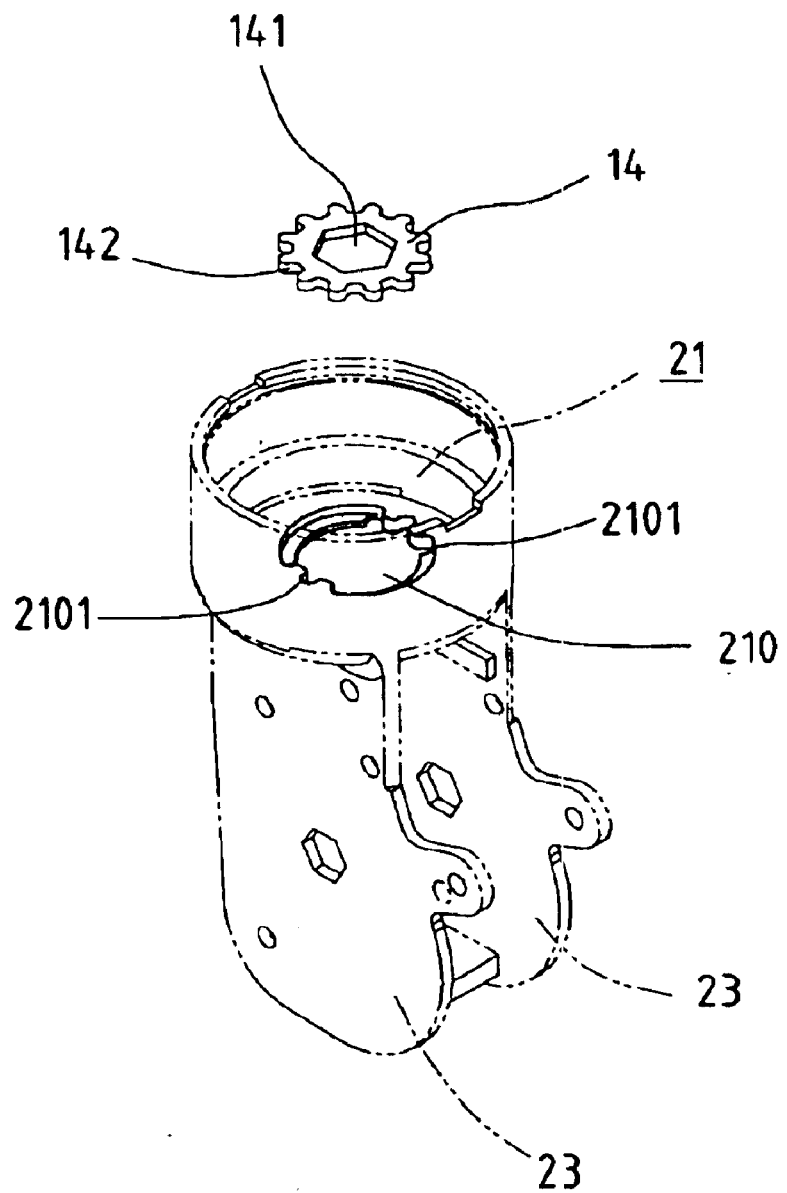
FIG. 4 shows a disk and a hole in the frame of the frame unit of the brake system of the present invention.

Further referring to FIG. 4, a frame unit 2 has a frame having an open top so as to receive the lower cam 13 therein and a hole 210 is defined through a bottom of the frame. A plurality of notches 2101 is defined in an inner periphery of the hole 210 so as to match with the teeth 142 of the disk 14 when the disk 14 is moved toward the hole 210. A bearing 18 is engaged with the open top of the frame and the tubular member 151 is received in a central hole of the bearing 18. A second C-shaped clip 20 positions the bearing 18 in the frame. Two plates 23 are connected to an underside of the frame and two wheel support arms 22 extend from the two plates 23.

Figure 5:
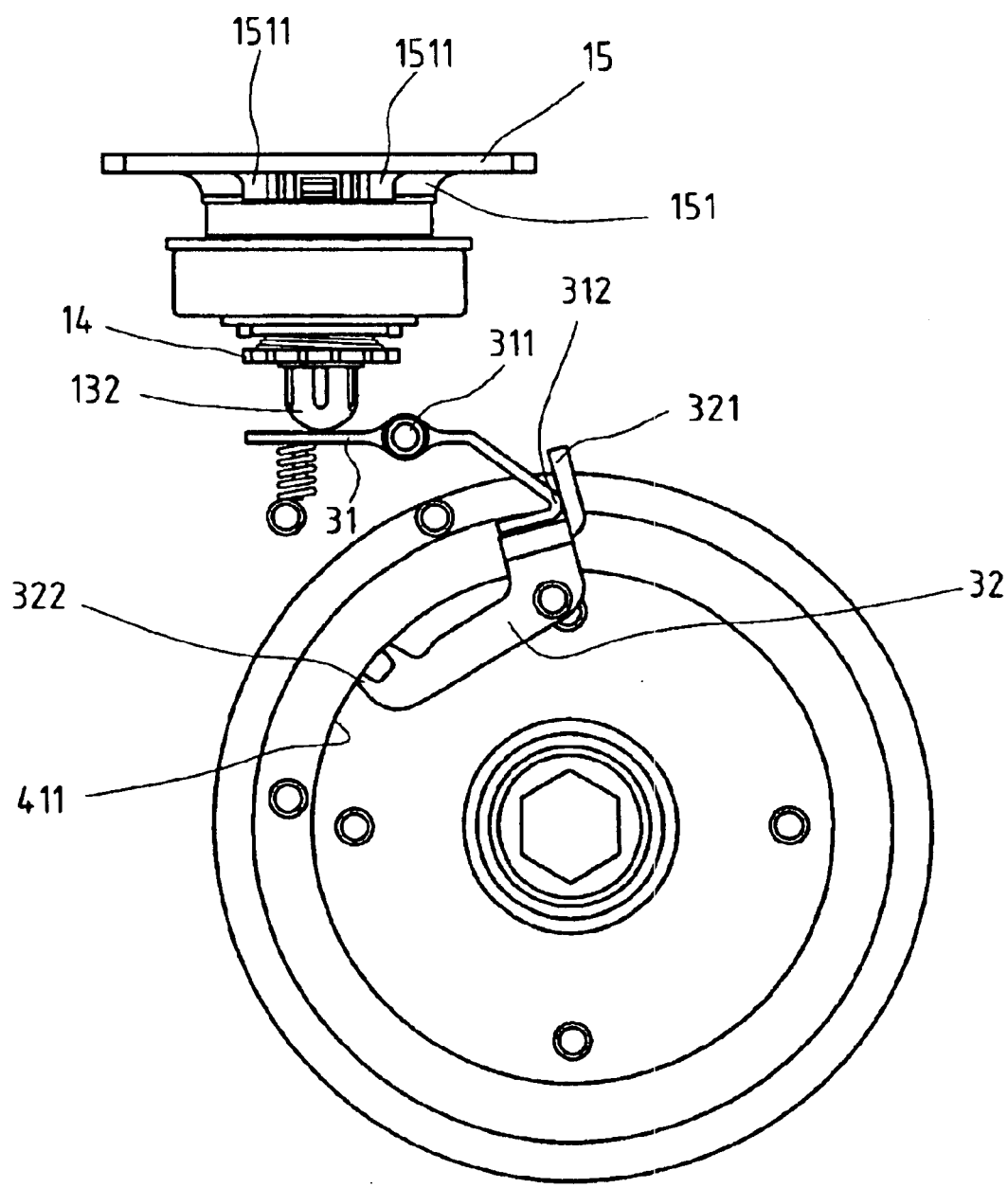
FIG. 5 is a side view showing the braking member and the wheel.
Figure 6:
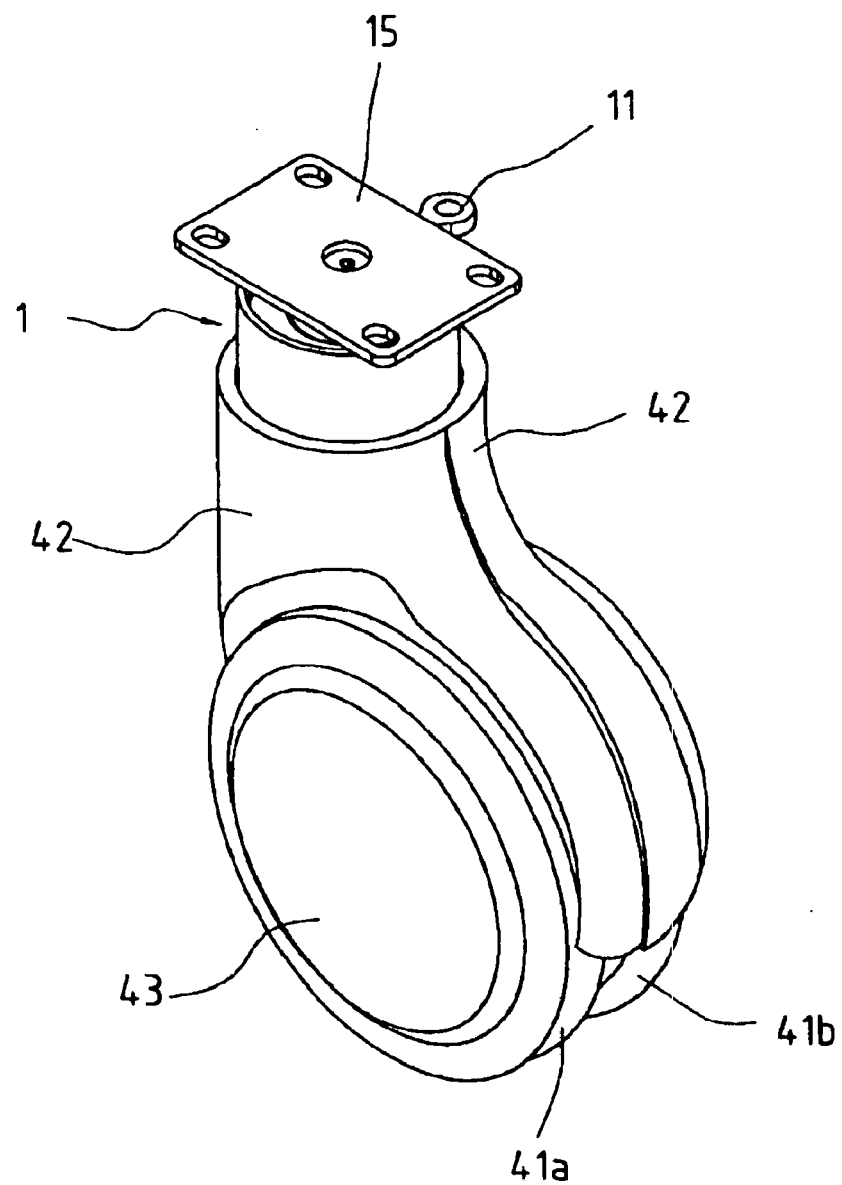
FIG. 6 is a perspective view showing the caster with the brake system of the present invention.

Further referring to FIG. 5, a braking unit 3 includes a pushing member 31 which has a pivot hole 311 and a pin 50a extends through the pivot hole 311 and the plates 23, such that the pushing member 31 pivotably located between the two plates 23 and a first end of the pushing member 31 can be pushed by the polygonal member 132 of the lower cam 13. The pin 50a has a groove 51a defined in an end thereof which extends through the two plates 23, and a C-shaped clip 52a engaged with the groove 51a. Each plate 23 has a lug 231 and a U-shaped braking member 32 having two legs are located on an outside of the two lugs 231. A pin 50b extends through holes 320 in the two legs of the braking member 32 and holes 2310 in the two lugs. The pin 50b has a groove 51b defined in an end thereof and extends through the two lugs 231, a C-shaped clip 52b is engaged with the groove 51b. A first end 321 of the braking member 32 can be pushed by a second end 312 of the pushing member 31 when the pushing member 31 is pivoted by the movement of the polygonal member 132. A cushion member 24 is located between the two plates 23 and has two through holes 242 such that pins 50 extend through holes 234 in the two plates 23 and the through holes 242 in the cushion member 24. The two wheel support arms 22 each have a first end thereof connected to the cushion member 24 at a center of the cushion member 24, and an axle 70 extends through holes 221 in the two wheel support arms 22 and a central hole 241 in the center of the cushion member 24. The axle 70 has two grooves 70a on two ends thereof and two C-shaped clips 70b are respectively engaged with the two grooves 70a to position the axle 70.

A wheel unit 4 is connected to two respective second ends of the wheel support arms 22. The wheel unit 4 includes a first part 41a and a second part 41b, both of which are respectively connected to the wheel support bars 22 by extending a shaft 60 through a central hole 410 in each of the first part 41a and the second par 41b and two holes 220 in the two wheel support arms 22. A first bush 25 is located between the two wheel support arms 22 and two second bushes 44 are respectively located between the two wheel support arms 22 and the first part 41a and the second part 41b. The shaft 60 has an enlarge end 61 at a first end thereof and is stopped on an outside of the first part 41a, a threaded hole is defined in a second end of the shaft 60 and a screw 80 is engaged with the threaded hole from an outside of the second part 41b. Each of the first part 41a and the second part 41b includes snap holes 412, two caps 43 are respectively mounted to the first part 41a and the second part 41b by inserting tongue members 431 on an inside of the caps 43 through the snap holes 412 of the first part 41a and the second part 41b. A cover 42 is mounted to the frame and receives the two plates 23 in the cover 42. The cover 42 is composed of two halves that are connected with each other by screws 90 engaged with threaded holes 420 in the two halves. An annular shoulder surface 411 is defined in the inside of each of the first part 41a and the second part 41b such that the second end 322 of the braking member 32 contacts the shoulder surfaces 411 and the wheel is stopped when the first end 321 of the braking member 32 is pushed by the second end 312 of the pushing member 31.

When braking, the disk 14 combines the frame as a one piece by matching the teeth 142 with the notches 2101 of the hole 210 such that the frame cannot rotate when the wheel is stopped.

While we have shown and described the embodiment in accordance with the present invention, it should be clear to those skilled in the art that further embodiments may be made without departing from the scope of the present invention.

What is claimed is:

1. A caster brake system comprising:

a connection unit having a connection plate on a top thereof and a tubular member connected to an underside of the connection plate, an upper cam rotatably received in the tubular member and having a serrated underside which includes first protrusions, a lower cam movably received in the tubular member and having a serrated top which has second protrusions, the lower cam being moved downward when a peak of each of the first protrusions contacts a peak of the second protrusion corresponding thereto, a disk connected to an underside of the lower cam and having teeth on an outer periphery thereof;

a frame unit having a frame having an open top so as to receive the lower cam therein and a hole defined through a bottom of the frame, a plurality of notches defined in an inner periphery of the hole so as to match with the teeth of the disk when the disk is moved toward the hole, two plates connected to an underside of the frame and wheel support arms extending from the two plates;

a braking unit having a pushing member pivotably located between the two plates and a first end of the pushing member being pushed by the underside of the lower cam, a braking member pivotably mounted to the two plates and a first end of the braking member being pushed by a second end of the pushing member, and a wheel unit connected to the wheel support arms and having an annular shoulder surface, a second end of the braking member contacting the shoulder surface when the first end of the braking member is pushed by the second end of the pushing member.

2. The system as claimed in claim 1, wherein the tubular member includes two first slots and a sleeve is received in the tubular member and has two second slots which are located in alignment with the first slots, a boss extending from an end of the tubular member and the sleeve having a flange which has a recess, the boss engaged with the recess, the upper cam having a passage defined in a top surface thereof and an operation bar extending through the first slots, the second slots and the passage of the upper cam such that the upper cam is rotated by operating the operation bar.

3. The system as claimed in claim 2, wherein a polygonal member extends from the underside of the lower cam and the disk has a polygonal hole through which the polygonal member extends, a spring located between the underside of the lower cam and the disk, a bearing engaged with the open top of the frame and the tubular member received in a central hole of the bearing.

4. The system as claimed in claim 3 further comprising a first C-shaped clip which fixes an end of the spring to the lower cam, and a second C-shaped clip which positions the bearing in the frame.

5. The system as claimed in claim 1, wherein the pushing member includes a pivot hole and a pin extends through the pivot hole and the plates.

6. The system as claimed in claim 1, wherein each plate has a lug and the braking member is a U-shaped member having two legs located on an outside of the two lugs, a pin extending through holes in the two legs of the braking member and holes in the two lugs.

7. The system as claimed in claim 1 further comprising a cushion member located between the two plates and having two through holes such that pins extend through holes in the two plates and the through holes in the cushion member, the two wheel support arms each having a first end thereof connected to the cushion member at a center of the cushion member, an axle extending through holes in the two wheel support arms and a central hole in the center of the cushion member, the wheel unit connected to two respective second ends of the wheel support arms.

8. The system as claimed in claim 1, wherein the wheel unit includes a first part and a second part, both of which are respectively connected to the wheel support bars by extending a shaft through a central hole in each of the first part and the second par, the shaft having an enlarge end at a first end thereof and being stopped on an outside of the first part, a threaded hole defined in a second end of the shaft and a screw being engaged with the threaded hole from an outside of the second part.

9. The system as claimed in claim 8, wherein each of the first part and the second part includes snap holes, two caps respectively mounted to the first part and the second part by inserting tongue members on an inside of the caps through the snap holes of the first part and the second part.

10. The system as claimed in claim 5, wherein the pin has a groove defined in an end thereof, which extends through the two plates, a C-shaped clip engaged with the groove.

11. The system as claimed in claim 6, wherein the pin has a groove defined in an end thereof, which extends through the two lugs, a C-shaped clip engaged with the groove.

12. The system as claimed in claim 8, wherein a first bush is located between the two wheel support arms and two second bushes are respectively located between the two wheel support arms and the first part and the second part.

\* \* \* \* \*